Dec. 29, 1931.  O. J. HERB  1,838,549
VALVED COUPLING
Filed March 19, 1928
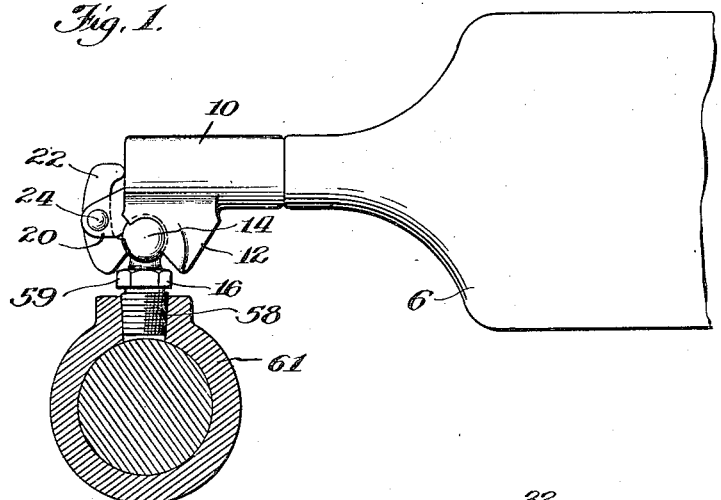
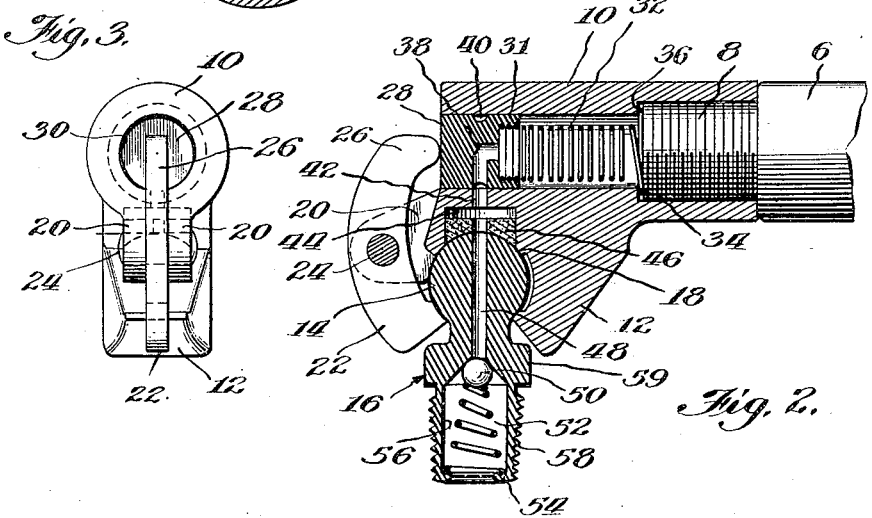
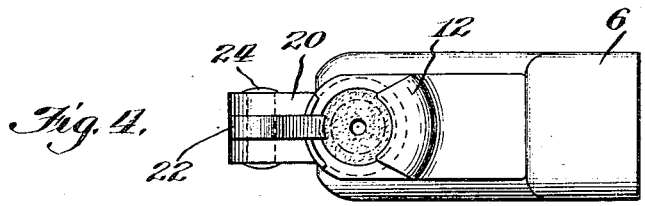
Inventor
Otto J. Herb
By Williams, Bradbury, McCaleb & Hinkle
Attys.

Patented Dec. 29, 1931

1,838,549

UNITED STATES PATENT OFFICE

OTTO J. HERB, OF CHICAGO, ILLINOIS, ASSIGNOR TO ALEMITE CORPORATION, OF CHICAGO, ILLINOIS, A CORPORATION OF DELAWARE

VALVED COUPLING

Application filed March 19, 1928. Serial No. 262,961.

My invention relates, generally, to lubricating apparatus and more particularly to apparatus of this class which comprises a compressor having a coupling nozzle which is adapted to be successively connected to suitable nipples attached to bearings to be lubricated.

It is an object of my invention to provide an improved coupling device in which the connection between the parts of the coupling is effected in part by the pressure of the lubricant.

A further object is to provide an improved valved coupling in which the valve is opened simultaneously with the completion of the coupling operation, and the opening of the valve and the coupling are each effected by the lubricant under pressure.

A further object is to provide a valved coupling in which the valve is automatically opened upon a predetermined lubricant pressure and automatically closed upon a reduction of the lubricant pressure.

A further object is to provide an improved coupling which is simple in construction, may be economically manufactured, and which is efficient in operation.

Other objects will appear from the following description, reference being had to the accompanying drawings, in which Fig. 1 is a side elevation of a portion of a compressor with a nozzle shown connected to a lubricant-receiving fitting attached to a bearing shown in section;

Fig. 2 is a longitudinal vertical section of the nozzle and lubricant-receiving fitting;

Fig. 3 is an end elevation of the nozzle; and

Fig. 4 is a bottom plan view thereof.

In the past it has been the practice to lubricate a number of bearings by successively connecting a suitable compressor to fittings attached to the bearings and thereby force the required amount of lubricant to the bearings. In these devices, the nozzle used to make the connection with the lubricant-receiving fitting usually required some manipulative operation to effect the mechanical connection between the parts. Through the use of my invention, the necessity for manipulating the nozzle so as to make the mechanical connection is entirely eliminated and it is merely necessary for the operator to place the nozzle upon the fitting and operate the compressor.

Upon an increase of pressure of the lubricant, the nozzle of my invention is adapted automatically to couple itself with the receiving fitting and at the same time open a passage for the flow of lubricant from the compressor into the fitting.

The nozzle may be applied to any suitable compressor or other source of lubricant under pressure. In Fig. 1, I have diagrammatically illustrated a portion of such a compressor at 6, the compressor having its reduced end portion 8 externally threaded so as to be adapted to be screwed into the body 10 of the coupling nozzle. The compressor may be of the type shown in the patent to Gullborg, No. 1,307,733, of the type shown in the patent to Zerk, No. 1,475,980, or of any other suitable construction.

The body 10 has a depending jaw 12 formed integrally therewith, the face of the jaw being conformed to engage the spherical head 14 of a suitable lubricant-receiving fitting 16.

The body 10 is provided with a seating surface 18 which conforms to the shape of the head 14 of the fitting 16 and has a pair of lugs 20 projecting from the forward end thereof. A jaw 22 is pivotally mounted on a rivet 24 which passes through and is secured in the lugs 20. The jaw 22 has an upwardly extending portion 26 which is adapted to be engaged by the end of a sliding valve member 28 which fits in a longitudinal bore 30 formed in the body 10. This valve member has one end thereof helically internally grooved at 31 to receive one end of a tension spring 32, the other end of which has an enlarged coil 34 which is clamped between a shoulder 36 and the end portion 8 of the compressor. The valve member 28 is thus normally drawn to the right (Fig. 2) by the spring 32.

The valve member has an L-shaped passage 38 leading from the bore 30 to a circumferential annular groove 40. Thus when the valve is in its leftmost position, as shown in Fig. 2, the groove 40 is in registry with a discharge port 42 which leads to an enlarged bore 44 in which a suitable perforated sealing gasket 46 is mounted for sliding movement.

The fitting 16 has a small longitudinal bore 48 which is adapted to register with the perforation in the sealing gasket 46. The lower end of the bore 48 is normally closed by a ball check valve 50 which is held in position by a spring 52, the lower end of which rests upon a ledge 54 spun inwardly at the lower end of the enlarged bore 56 formed at the lower end of the fitting. The fitting has suitable threads 58 and a hexagonal wrench engaging portion 59 by which it may be screwed into the oil hole of a bearing 61.

In operation, the nozzle will be positioned against the fitting with its seating surface 18 and its jaw 12 in contact with the head thereof. The lubricant will thereupon be placed under pressure and will force the valve member 28 to the left against the tension of the spring 32 until the valve is in the position shown in Fig. 2.

During the leftward movement of the valve member, it will contact with the end of the arm 26 and pivot the latter counterclockwise until its jaw portion 22 abuts beneath the head 14 of the fitting, thereby rigidly locking the nozzle to the fitting. As soon as the valve member reaches its leftmost position, as above described, lubricant will flow from the compressor through the bore 30, passageway 38 and into the bore 44 above the sealing gasket 46, exerting a downward pressure on the gasket and forcing it into sealing engagement with the upper end surface of the fitting. Lubricant will thereupon flow into the fitting through the longitudinal bore 48 and, unseating the check valve 50, will flow into the bearing to be lubricated.

Upon relieving the pressure on the lubricant in the compressor, the spring 32 will move the valve member 28 to the right, thus preventing further flow of lubricant to the bearing and allowing the jaw member 22 to rock clockwise and thereby permit disengagement of the coupling nozzle and fitting.

The coupling connection may be made with the nozzle at different angles to the fitting, the degree of angular adjustability being limited by the engagement of the ends of the jaws 12 and 22 with the hexagonal portion 59 of the fitting. The coupling connection may be made in an extremely short time since it is necessary merely to place the nozzle over the fitting and build up the pressure in the compressor sufficient to slide the valve member to the left. Thus the coupling has a great many of the advantages of a contact coupling and retains the advantage of having the coupling nozzle rigidly connected to the fitting.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. A coupling for high pressure lubricating apparatus comprising a lubricant-receiving fitting having an enlarged head portion, a lubricant compressor, a nozzle adapted to be supplied with lubricant under pressure from said compressor, said nozzle having surfaces adapted to seat upon the head of said fitting, a jaw pivotally mounted upon said nozzle, and means actuated by the lubricant under pressure to move said jaw beneath the head of the fitting thereby to clamp the nozzle to the fitting.

2. In lubricating apparatus of the class described, the combination of a lubricant compressor, a nozzle connected thereto, said nozzle having a jaw rigid therewith and a cylindrical bore therein, a valve member reciprocable in said bore, a spring tending to draw said member inwardly, a jaw pivotally secured to said nozzle, a lubricant receiving fitting having an enlarged end portion adapted to be engaged by said jaws, and interengaging means on said pivoted jaw and said member whereby movement of the latter will force said jaw into clamping engagement with said fitting.

3. In apparatus of the class described, the combination of a lubricant-receiving fitting having a substantially spherical head portion, a nozzle having a surface adapted to contact with the head portion of said fitting, a clamping jaw pivotally mounted on said nozzle and inclined surfaces engageable beneath the head portion of said fitting and adapted to draw said nozzle toward and clamp it against the head portion of said fitting, a piston valve in said nozzle adapted to be moved in one direction to cause said pivotally mounted jaw to engage the head of said fitting, and resilient means for retracting said piston valve.

4. A coupling for high pressure lubricating apparatus comprising a lubricant-receiving fitting having an enlarged substantially spherical head portion, a lubricant compressor, a nozzle adapted to be supplied with lubricant under pressure from said compressor, said nozzle having inclined surfaces adapted to seat upon and partially beneath the head of said fitting, a jaw pivotally mounted upon said nozzle, said jaw having an inclined engaging surface cooperable with the lower surface of said fitting and means actuated by the lubricant under pressure to move said jaw beneath the head of the fitting thereby to clamp the nozzle to the fitting.

5. In apparatus of the class described, the combination of a lubricant-receiving fitting having a substantially spherical head portion, a nozzle having a surface adapted to contact with the head portion of said fitting, a clamping jaw pivotally mounted on said nozzle and adapted to clamp said nozzle to the head portion of said fitting, a piston element in said nozzle adapted upon application of lubricant pressure to be moved in one direction to cause said pivotally mounted jaw to engage the head of said fitting, and resilient means for retracting said piston element.

In witness whereof, I hereunto subscribe my name this 8th day of March, 1928.

OTTO J. HERB.